A. J. HALL.
LUBRICATING DEVICE.
APPLICATION FILED JAN. 5, 1917.
1,277,410.
Patented Sept. 3, 1918.
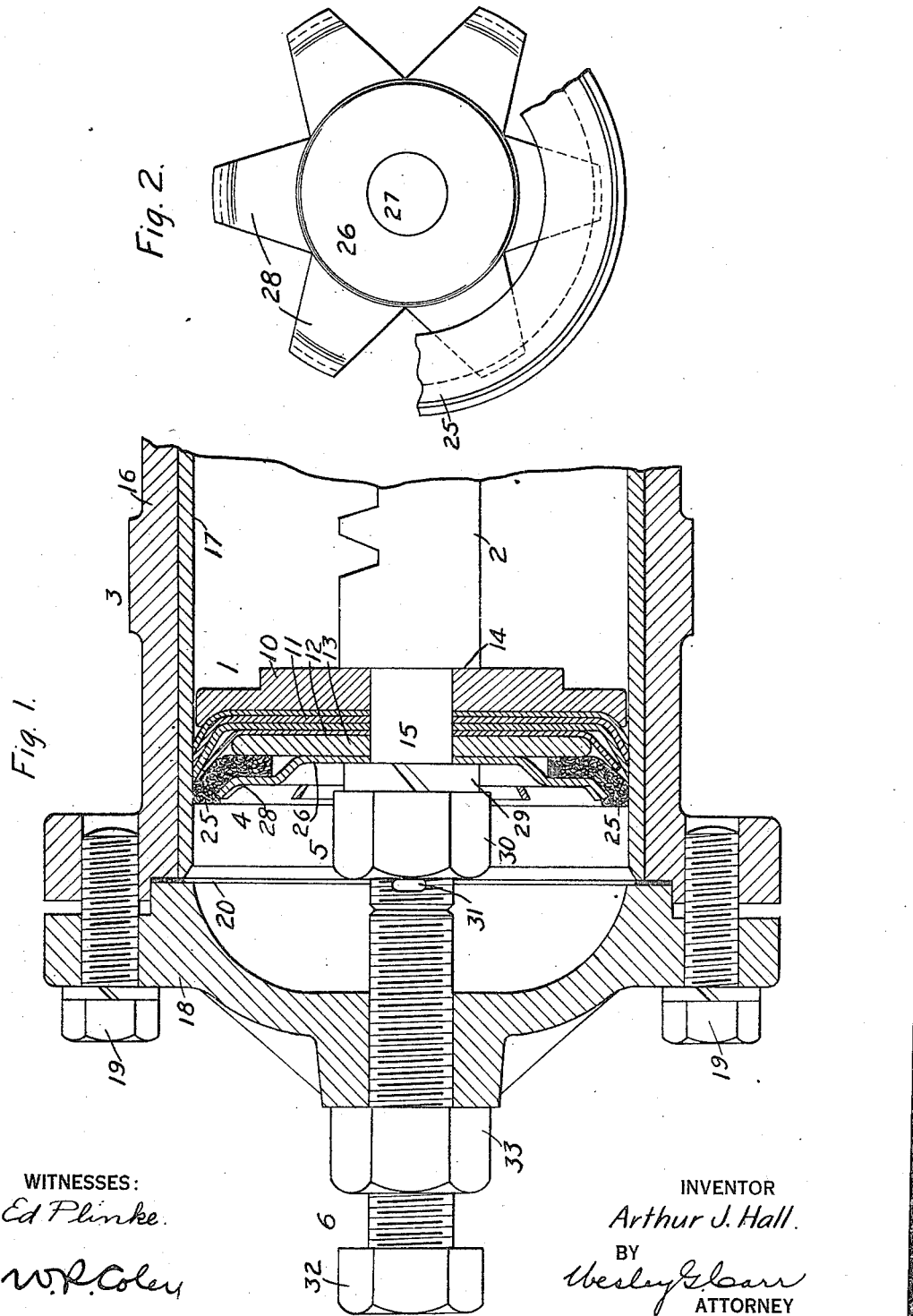
WITNESSES:
Ed Plinke.
W. P. Coley
INVENTOR
Arthur J. Hall.
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

LUBRICATING DEVICE.

1,277,410.

Specification of Letters Patent.

Patented Sept. 3, 1918.

Application filed January 5, 1917. Serial No. 140,735.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Lubricating Devices, of which the following is a specification.

My invention relates to lubricating devices and especially to the lubrication of the interior walls of a cylinder within which a piston operates.

The object of my invention is to provide a relatively simple, inexpensive, compact and rugged structure of the above-indicated character for effectively and reliably performing the desired function of suitably lubricating the cylinder walls.

More specifically stated, it is the object of my invention to combine, with the customary type of piston member, a lubricant-containing member, preferably of textile material, and a flexible retaining means for positioning the lubricant-containing member to suitably rub the cylinder walls, such retainer being secured to the piston stem or rod.

My invention may best be understood by reference to the accompanying drawing, wherein Figure 1 is a view, in longitudinal section, of one end of an operating cylinder and of a piston therefor that is provided with my lubricating device; and Fig. 2 is a fragmentary plan view of the lubricating device proper.

Referring to the drawing, the structure shown, in general, comprises a piston member 1 that is provided with a stem or rod 2; an operating cylinder 3 for the piston member; my lubricating device 4; securing means 5 for attaching the piston member 1 and the lubricating device 4 to the piston stem 2; and an adjustable stop 6 for performing a double function to be described.

The piston member 1 comprises a suitably stiff backing member 10, upon one face of which a plurality of cupped washers or piston rings 11 are placed, being suitably held in position through the agency of a dished metal retainer 12 and a heavy washer 13. The piston stem 2 is provided with an annular shoulder 14 that abuts against the backing member 10, and the integral end-portion 15 of the stem 2 is of relatively small diameter and extends through alined openings in the various parts that comprise the piston member 1, the end-portion 15 being suitably threaded for a purpose to be set forth.

The operating cylinder 3 comprises an outer incasing member 16 of cast iron or other suitable material and an inner lining or sleeve member 17, preferably of brass or some similar material, as is customary. A suitable end member or cap 18 for the cylinder is provided, being secured thereto in any suitable manner, as by a plurality of bolts 19, a gasket 20 being preferably interposed between the cap 18 and the cylinder proper for the usual purpose of rendering the cylinder fluid-tight.

My lubricating device 4 comprises a metallic plate member or retainer 26 having a central or body portion that is provided with an opening 27 for fitting over the end-portion 15 of the piston stem 2, and also has a plurality of flexible arms 28 that are bent or raised away from the outer or concave face of the piston member 1 for the purpose of resiliently retaining in position an annular member or washer 25 of absorbent textile material, such as felt, which is thus held in position between the retainer 26 and the lining 17 of the cylinder to suitably rub the cylinder walls, as the piston member 1 travels within the cylinder. The retainer 26 is preferably formed of flexible sheet-steel material, whereby a comparatively small amount of space is required by the lubricating device and the entire arrangement is of a relatively simple character.

The securing means 5 is preferably of the usual type, comprising a lock-washer 29 and a nut 30 that are fitted over the threaded end-portion 15 of the piston stem, the nut being suitably tightened to rigidly assemble the piston-member parts and also thereby effect the exertion of a suitable resilient pressure by the retainer 26 upon the felt washer 25. A cotter-pin 31 may be employed to prevent backing off of the nut 30, in accordance with a familiar practice.

The adjustable stop 6 is shown as comprising a bolt 32 that extends through a threaded aperture in the cap 18 in substantial alinement with the end-portion 15 of the piston stem 2. By adjusting the position of the bolt 32 and then locking the bolt in place, by means of a nut 33 which bears against the cap 18, the normal, or illustrated position of the piston member 1 is determined. For the purpose of admitting oil or other lubricant to the cylinder 3, the adjustable stop 6 may be temporarily removed and such lubricating material may be injected through the aperture in the cylinder cap 18. Such lubricant is thereupon gradually absorbed by the felt washer 25 and is suitably spread upon the cylinder walls as the piston reciprocates within the cylinder 3.

I have thus provided a relatively compact and simple lubricating device for cylinder walls which is flexibly held in position by the same securing means that serves to attach the piston member 1 to the stem 2.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a piston member and an operating cylinder therefor, of annular lubricant-containing means positioned to rub the cylinder walls, and means for flexibly securing the lubricant-containing means directly upon said piston member.

2. The combination with a piston member and an operating cylinder therefor, of absorbent textile material positioned to rub the cylinder walls, and resilient means for securing said material upon one face of said piston member.

3. The combination with a piston member having a concave face and an operating cylinder for said piston member, of a flexible plate member centrally secured to said concave face and having its outer edge raised away from said face, and textile material resiliently positioned between said outer edge and the piston member to rub the cylinder walls.

4. The combination with a piston member having a concave face and an operating cylinder for said piston member, of a plate member centrally secured to said face and having a plurality of flexible arms raised away from said face, and textile material positioned between said arms and the piston member to rub the cylinder walls.

5. The combination with a piston member having a concave face and an operating cylinder for said piston member, of a metallic plate member centrally secured to said face and having a plurality of flexible radially-extending arms raised away from said face, and an annular member of textile material held in position between said arms and the piston member to rub the cylinder walls.

In testimony whereof, I have hereunto subscribed my name this 27th day of Dec. 1916.

ARTHUR J. HALL.